No. 693,532. Patented Feb. 18, 1902.
H. H. PULVER.
RECEPTACLE OR CASING FOR VENDING MACHINES, &c.
(Application filed Jan. 17, 1901.)
(No Model.) 3 Sheets—Sheet 1.
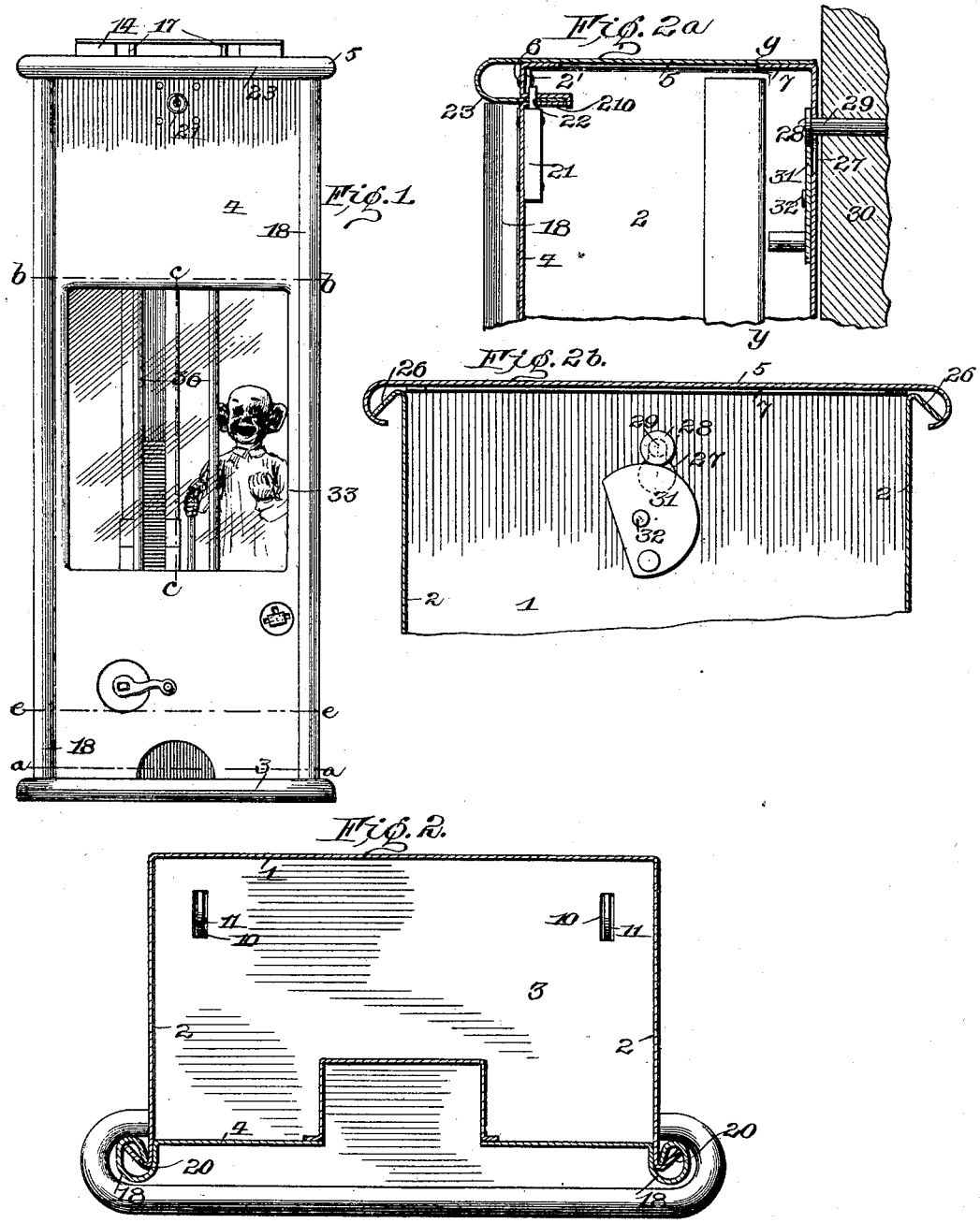

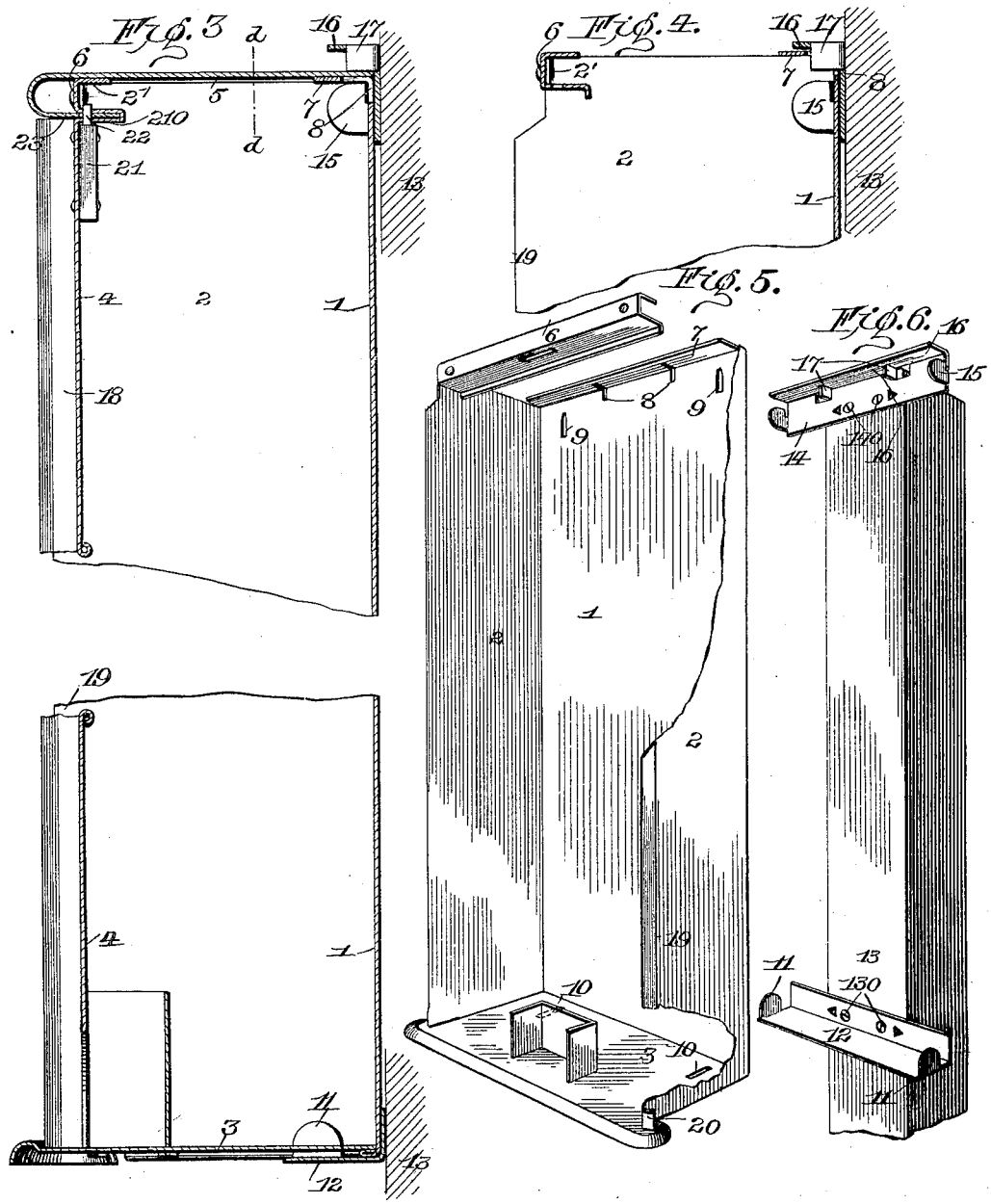

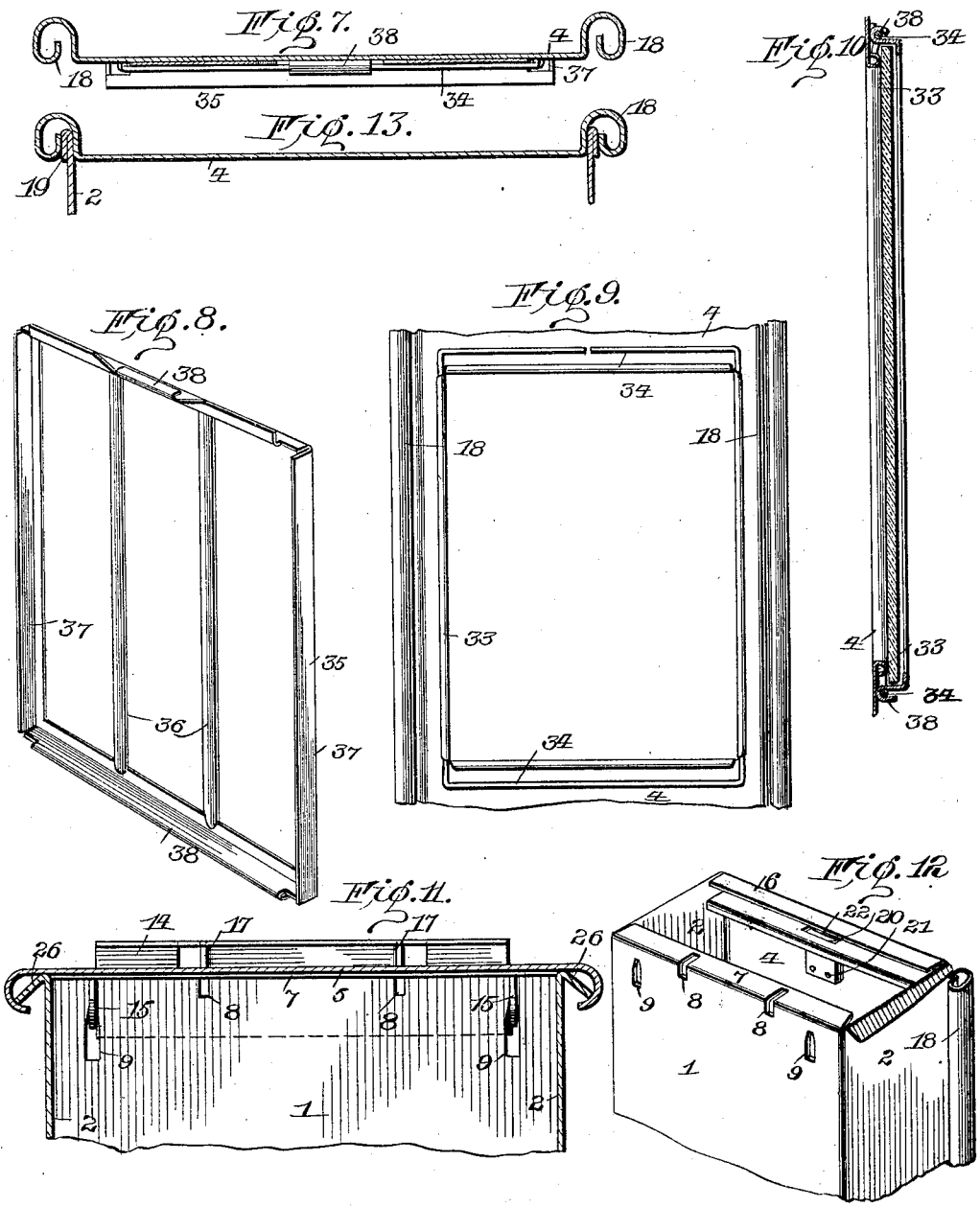

UNITED STATES PATENT OFFICE.

HENRY H. PULVER, OF ROCHESTER, NEW YORK, ASSIGNOR TO THE PULVER CHEMICAL COMPANY, OF ROCHESTER, NEW YORK, A CORPORATION OF NEW YORK.

RECEPTACLE OR CASING FOR VENDING-MACHINES, &c.

SPECIFICATION forming part of Letters Patent No. 693,532, dated February 18, 1902.

Application filed January 17, 1901. Serial No. 43,572. (No model.)

*To all whom it may concern:*

Be it known that I, HENRY H. PULVER, of Rochester, in the county of Monroe and State of New York, have invented certain new and useful Improvements in Receptacles or Casings for Vending-Machines, &c.; and I do hereby declare the following to be a full, clear, and exact description of the same, reference being had to the accompanying drawings, forming a part of this specification, and to the reference-numerals marked thereon.

My present invention has for its object to provide a receptacle or casing adapted to be placed in public places and not immediately under the control or inspection of interested persons—as, for instance, for coin-controlled vending-machines, letter-boxes, or similar containers—and which shall be cheap and simple in construction and is formed and attached to its support in such manner that it cannot be removed bodily excepting by authorized persons, the securing devices being capable of operation only when a lid or cover is removed, which latter also, if desired, controls access to the interior of the casing; and to these and other ends the invention consists in improvements hereinafter described, the novel features being pointed out in the claims at the end of this specification.

In the accompanying drawings, Figure 1 is an elevation of a receptacle or casing embodying my improvements and adapted particularly for containing a coin-controlled vending device; Fig. 2, a horizontal sectional view of the lower portion, taken on the line $a\,a$ of Fig. 1; Fig. 2$^a$, a vertical sectional view of a modification of the securing device; Fig. 2$^b$, a vertical sectional view of the same, taken on the line $y\,y$ of Fig. 2$^a$; Fig. 3, a vertical sectional view of the receptacle or casing and the preferred form of securing devices; Fig. 4, a similar view of the upper portion, showing the manner of applying the device and with the front and lid or cover of the casing removed; Fig. 5, a perspective view of the casing with the front removed; Fig. 6, a view of the receptacle-support; Fig. 7, a sectional view on the line $b\,b$ of Fig. 1; Fig. 8, a perspective view of the glass-holding frame; Fig. 9, a rear view of the front plate of the casing; Fig. 10, a vertical sectional view on the line $c\,c$ of Fig. 1; Fig. 11, a sectional view on the line $d\,d$ of Fig. 3; Fig. 12, a perspective view of the upper end of the casing; Fig. 13, a horizontal sectional view on the line $e\,e$ of Fig. 1.

Similar reference-numerals in the several figures indicate similar parts.

The main portion of the casing or receptacle embodies the casing-section consisting of the back plate 1 and side plates 2 2, preferably formed integral therewith, the latter being bent at right angles to the back, a bottom plate 3, secured to the lower end of the first-mentioned casing-section, a removable front panel or plate 4, and the removable cover or top plate 5. At the upper portion of the sides are wings or plates 2′, and connecting the latter is a cross-brace or channel-bar 6, with which both the top plate and the front plate or section 4 coöperate through the medium of suitable locking devices to hold the parts.

The back panel or plate 1 of the casing is provided at the top with a forwardly-extending flange 7, and extending through said flange and also vertically in the back are the slots 8, and near the upper portion of said back panel or plate 1 are also provided slots 9. The bottom plate 3 is provided with the slots 10, through which are adapted to extend ears 11, formed upon an angle plate or bracket 12, rigidly secured to a suitable support 13, as by screws 130, covered by the casing when in place, and also secured to this support and near the upper end of the receptacle or casing is a bracket or plate 14, secured by screws 140 and having at the sides hooked lugs 15, adapted to coöperate with the slots 9 in the back panel or plate 1 of the casing, said bracket being also provided with an overhanging flange 16 and with integral lugs or projections 17, arranged below the flange, as shown in Fig. 6. The front plate or panel 4 of the casing is provided at the sides with the integral rolls or curled flanges 18, as shown in Figs. 2 and 7, and the side panels 2 are provided for the greater portion of their length with the double or stiffened edges 19, as shown in Figs. 5 and 13, and at the bottom are provided with flaring flanges 20, as shown in Fig.

2, and the bead or flange 18 on the front plate coöperates with the edges 19, as shown in Fig. 7, to make a tight joint, while at the bottom portion the coöperation of the flanges 18 and 20, as shown in Fig. 2, will prevent the forward movement of the front panel 4, locking the parts together when in proper position. At the upper end of the front panel 4 is provided a key-lock 21, the movable bolt 22 of which is adapted to extend through a flange 210 thereon and a suitable aperture formed in the under flange of the brace or bridge piece 6 and also through the lower flange 23 of the lid or top plate 5, as shown particularly in Fig. 3, this construction serving to effectually secure the front panel in place when the top or lid 5 is secured by the bolt, as shown. The lugs or projections upon the supporting-brackets 12 and 14 are so arranged relative to the slots 8, 9, and 10 and the other coöperating parts that in order to apply the casing to the support (assuming the lid 5 to be removed) the casing is moved backward to the position shown in Fig. 4 and downward relative to the support, and the projections 11 are inserted in the slots 10 in the bottom, and the lugs 15 are passed through the slots 9 at the upper end. Then the casing is supported upon the bracket 12, the lugs 11 extending through the bottom and the hooked portions of the lugs 15 engaging the back plate 1 and preventing a forward movement. Then the curl or bead 18 on the lower end of the panel 4 is engaged with the flanges or ears 20 of the side plates, the panel being slid downward and the upper end moved backward beneath the brace 6. Then the cover 5 is slid upon the top of the casing, the curled flanges 26 formed at the top of the side panels 2, (see Fig. 2$^b$,) the rear portion of said top piece extending beneath the lugs 17 on the upper supporting-bracket 14 and effectually closing the upper ends of the slots 8 in the back panel 1, and when the lower forward flange 23 of said top is in position beneath the lower flange of the cross-bar 6 the lock 21 is operated, securing the parts rigidly in position and preventing the removal of the top or front panels and also preventing the removal of the casing as a whole from the supporting-brackets, all as will be understood from an inspection of Figs. 3 to 6, inclusive. Instead of employing the brackets shown the lower end of the casing might rest upon a bracket similar to the bracket 12 and the upper end of the panel 1 have an aperture 27, through which might pass the head 28 of the stud or pin 29, secured to a support 30, said aperture 27 having a narrow slot leading therefrom toward the upper edge for the reception of the shank of the stud, the upward movement of the casing being prevented by a notched or segmental plate 31, pivoted at 32 to the inner side of the casing and adapted to have its periphery brought in contact with the lower side of the head of the stud 29, as shown in Figs. 2$^a$ and 2$^b$.

A casing or receptacle constructed as described is capable of being used for any purpose desired—as, for instance, a letter-box; but I prefer to arrange within it a suitable coin-controlled vending mechanism, such as shown in a pending application filed simultaneously herewith by Frank F. Pulver and preferably embodying an automaton designed to make certain movements each time the vending device is operated, and for the purpose of permitting the inspection of the automaton and of the commodity to be vended or of any other material or device contained within the casing I provide in the front panel or plate 4 an opening, at the edges of which are formed inwardly-extending flanges or beads 33, those at the sides of the opening encircling the vertically-extending arms of the wire frame or yoke 34 in such manner that the said yoke is capable of a slight vertical movement. Arranged in rear of the opening is a glass-holding frame 35, preferably composed of a single piece of sheet metal formed with the integral beaded ribs 36 and having the flanges 37 at the sides and the rearwardly-extending flanges or beads 38 at the upper and lower edges adapted to be engaged by the horizontally-extending portions of the wire frame or yoke 34 to secure said frame 35 and the glass held therein in position, as shown in Fig. 10.

By the employment of a receptacle or casing such as shown a single fastening device secures the lid or cover and controls the attachment and removal of the receptacle relative to its support. The apparatus can be held securely and only removed by the person having the key and who may also have access to the interior for the purpose of replenishing the commodity to be sold and of removing coins or other material which may be contained within it.

The various parts may be cut from sheet metal and formed up by hand or the use of suitable dies and assembled by an unskilled operator, or it will be understood that they may be made of cast metal; but I find in practice that sheet metal is more economical and answers all purposes.

While it is desirable that the front of the casing be removed when the receptacle is used for vending devices of the general class described, the front might be rigidly secured and the supporting and attaching devices shown employed.

The object in providing the lugs 17 on the bracket or support 14 is to provide rigid shoulders or abutments with which the cover or panel 5 engages and which are not liable to be bent to detach the device, as might be the case if said panel engaged directly with the flange 16.

While I prefer to locate the movable panel 4 at the front, as described, it will be understood that it could, if desired, be located at either side, the terms "front," "rear," and "side" being used in this instance relatively to the support. Similarly, while I prefer to locate the glass-covered window in the front panel it could as well be located in either side panel, if desired.

I claim as my invention—

1. The combination with a support, a receptacle mounted thereon and having a sliding panel and locking devices between the receptacle and support capable of disengagement only when the panel is removed, of a second removable panel adapted to cover or protect the contents of the receptacle, movable at an angle to the sliding panel and coöperating with and locked by the sliding panel when the latter is in position.

2. The combination with a support, a receptacle mounted thereon and having two relatively movable and engaging panels, constituting a portion of the exterior of the receptacle, one preventing the independent operation of the other, of securing devices for one of the panels and locking devices for securing the receptacle to the support operable only when one of the panels is moved from normal locked position.

3. The combination with a receptacle having the flanges and the sliding panel or cover having the flanges engaged therewith and movable thereon, of a support and securing devices between the support and receptacle, concealed by the panel and detachable by the relative movement of the support and receptacle and a locking device for the panel.

4. The combination with a support, a receptacle mounted thereon, having a movable panel and locking devices between the receptacle and support capable of disengagement only when the panel is removed, of a second movable panel constituting a portion of the exterior of the receptacle adapted to cover or protect the contents thereof and secured in position by the first-mentioned panel or cover.

5. The combination with the support having the hooked engaging projections thereon, of the receptacle having the apertures for the projections and the cover or panel movable on the receptacle and adapted when in place to coöperate with the support and prevent the disengagement of the receptacle.

6. The combination with the bracket having the integral hooked projections and a lug extending in a plane parallel therewith, of the receptacle coöperating with the projections and the cover or panel sliding on the receptacle and coöperating with the lug to lock the receptacle in place.

7. The combination with the supporting-bracket embodying the integral hooked projections and the lugs extending in planes parallel therewith, of the receptacle having the slots for the lugs and brackets and the movable panel or cover on the receptacle coöperating with the lugs on the bracket to prevent the relative movement of the bracket and receptacle when the panel is in place.

8. The combination with a supporting-bracket having the integral hooked projections, the lugs and the flange extending over them, of the receptacle having the flange thereon and the slots for the lugs and projections and the cover or panel sliding on the receptacle and coöperating with the lugs on the bracket.

9. The combination with the receptacle having a removable panel locked to the receptacle by a movement in one direction parallel therewith, of a removable panel or cover interlocked with the receptacle by a movement at an angle to that of the first-mentioned panel and locking devices between the two panels for preventing relative movement.

10. The combination with the casing having two open sides extending at an angle and a brace at the end of said open sides, of two removable panels or covers engaging with the said casing and locked thereto by their longitudinal movements on the casing and a locking device for securing said panels to each other and to the brace when in position.

11. The combination with the casing having two adjacent open sides extending at an angle, and provided with the flanges at the sides, of the two panels adapted to close said open sides having flanges engaging those on the casing when moved longitudinally, and locking devices between the proximate edges of the panels when in position to close the casing.

12. In a receptacle, the combination of the rear and side panels, the latter having the flanges at the top and one end of the front portion and the brace connecting their upper ends, the removable front and top panels having flanges coöperating with the first-mentioned panels and engaged therewith by a longitudinal movement, and locking devices between the removable panels for preventing their relative movement when in position.

13. The combination with the rear and side panels, the latter having the flanges at the lower portion of the front thereof and also having the flanges at the top, of the removable front panel having the flanged or beaded edges coöperating with the side panels, the brace at the top of its side panels, the removable top panel having the flanges at the edges, and a locking device coöperating with the proximate edges of the removable panels and with the brace.

14. The combination with the support, the bracket 12 thereon having the projections 11, the bracket 13 having the projections 15, projections 17 and flange 16, of the receptacle having the slots 8, 9, and 10, for engaging the projections in the bracket and the movable panel on the receptacle adapted to engage the projections 17.

15. In a receptacle such as described, the combination with a panel having an opening provided with the flanges at the edges thereof, of the yoke extending beneath the flanges and across the ends of the aperture and a removable frame engaging the yoke on opposite sides of the aperture.

16. In a receptacle such as described, the combination with a panel having an opening provided with the flanges at the edges thereof, of the yoke extending beneath the flanges and across the ends of the aperture, a removable frame having the ears engaging the yoke on opposite sides of the aperture and the glass arranged between the frame and panel.

17. In a receptacle such as described, the combination with a panel having the aperture and the inwardly-turned flanges at the edges thereof, of the rods secured in the side flanges and extending near the ends of the aperture, and a glass-frame arranged within the casing and engaging the rods at the ends of the aperture.

18. In a receptacle such as described, the combination with a panel having the aperture and the inwardly-turned flanges at the opposite edges thereof, of the rods secured in the side flanges and extending near the ends of the aperture and the glass-frame having the flanges at the ends coöperating with the rods at the ends of the aperture.

19. In a receptacle such as described, the combination with a panel having an aperture therein, the glass-containing frame arranged on the inner side of the panel having the glass-holding flanges and the securing-flanges formed therewith, and means at the ends of the aperture in the panel for engaging and holding the securing-flanges of the frame.

20. The combination with the panel having an aperture therein and the flanges at opposite sides thereof, of a glass-holding frame having securing-flanges at the ends thereof, and a continuous yoke or wire extending through the flanges on the panel and engaging the securing-flanges on holding-frame.

21. The combination with the panel having the aperture therein, of the glass-holding frame arranged at the inner side of the panel having the integral bars 36, the flanges 37 and 38 at the sides and ends, respectively, and connecting devices between the flanges 38 and the panel.

HENRY H. PULVER.

Witnesses:
G. WILLARD RICH,
WALTER B. PAYNE.